Patented May 22, 1951

2,554,439

UNITED STATES PATENT OFFICE 2,554,439

MODIFICATION OF CELLULOSE BY BORON TRIFLUORIDE SOLUTION

Louis H. Bock, Huntingdon Valley, Pa., assignor to Röhm & Haas Company, Philadelphia, Pa., a corporation of Delaware No Drawing. Application April 22, 1948, Serial No. 22,729

7 Claims. (Cl. 8—116)

This invention concerns a process for modifying cellulose by treating it with strong aqueous solutions of boron trifluoride and has for its objects the improvement of cellulose whether in the form of yarns, woven fabrics, felted sheets, or other forms, the imparting to cellulose of an increased degree of translucency and parchment-like properties, and the reforming of cellulose fibers into filaments and sheets.

These and other objects are accomplished by treating cellulose with a solution of 58% to 67% of boron trifluoride in water. The temperature for treating is desirably kept from about 30° C. down to the freezing point of the solution and may preferably be $-5°$ C. to 20° C. The time used for treating is a factor determining the extent of modification of cellulose which results. After treatment of cellulose with the boron trifluoride solution, the boron trifluoride is removed or destroyed as by washing it away with water or reacting it with an alkaline substance.

The effect of the aqueous boron trifluoride solutions is in part that of a solvent. When a fabric or a mat of cellulose fibers is passed through such solution and the solution is removed without delay, small, fine fibers, loose ends, and the like are removed. This effect has been called "chemical singeing." Slight additional action imparts to woven fabrics a linen-like finish. With a longer time for action of boron trifluoride-water solutions on cellulose, the fibers become more transparent and organdy effects are obtained. These border on parchmentizing, readily obtained by continuing the action of the aqueous reagent short of solution, which occurs when cellulose is left in contact with the boron trifluoride solutions. Thus, felts or mats of cellulose fibers may readily be parchmentized and are noticeably tougher, harder, and more resistant to water.

When the action of the reagent solutions is allowed to continue, solutions are obtained from which cellulose is reprecipitated upon dilution or upon contact with an alkaline solution. When solutions are ejected into aqueous baths, filaments or sheets or other shapes are formed.

Another use of the cellulose solutions is for finishing textile fabrics. Thus, a woven cotton fabric is passed through a bath containing 5% of cellulose in a solution made by dissolving 60 parts by weight of boron trifluoride in 40 parts of water. The treated fabric is rinsed in running water, in a dilute soda ash solution, and again in water. It is then dried on a tenter. A crisp organdy-finished fabric is obtained.

An aqueous solution of boron trifluoride is made by passing gaseous boron trifluoride into water with external cooling of the reaction vessel. When 206 parts of the fluoride are absorbed by 100 parts of water, the reaction mixture is cooled. A few boric acid crystals form and are separated by filtration through sintered glass. The resulting solution has a specific gravity of 1.674 and an equivalent $BF_3$ content of 65.7% by analysis.

Five parts of cellulose floc are stirred into 100 parts of this solution at room temperature. In ten minutes the floc is completely dissolved. Extrusion of this solution into water gives a monofilament which is washed and dried. The product is somewhat translucent and has good strength.

Another solution of boron trifluoride is made in water, the weight of boron trifluoride taken up being 63% of the solution. It dissolves cellulose readily. The cellulose is precipitated when the solution is ejected into water or into dilute sodium hydroxide solutions.

Yet another solution may be made with 58 parts of boron trifluoride and 42 parts of water. It, too, dissolves cellulose and the cellulose is recoverable therefrom upon dilution or treatment with alkaline reagents. Concentrations below 58% cause cellulose to swell, but do not dissolve it.

As just described, solutions are readily prepared containing as much as 10% of cellulose. They are useful for treating and finishing cellulose products in the form of yarns, fabrics, or felts and for forming filaments and sheets as has been described.

A solution of 67% of boron trifluoride in water is used as a standing bath at 20° C. An 80 x 80 cotton sheeting is passed therethrough at a rate such that the cloth is in the bath for two minutes. The cloth is then passed between rollers and into running water and then dried. It has become parchmentized and much denser than the original cloth.

A strip of paper is run through the 67% solution at a rate providing an immersion of 30 seconds in the bath. The treated strip is passed through rollers and into a water bath. The resulting product is much denser and tougher than the original paper. It increases in tensile strength, is quite scuff-resistant, and has good wet strength.

The effective aqueous solutions used for the practice of this invention are those made with 58% to 67% of boron trifluoride. These limits correspond roughly to the hydrates $BF_3.2H_2O$ and $BF_3.3H_2O$, although somewhat more boron trifluoride is required for causing solution than occurs in the latter compound. Nevertheless, the higher hydrate causes swelling of cellulose. While it may be that the boron trifluoride exists in solution as a hydrate or as a hydrofluoric or fluoroboric acid, the expressions "aqueous solution of 58% to 67%" or "solution made by dissolving 58 to 67 parts by weight of boron trifluoride in water to make 100 parts" and the like are used to include these possibilities.

The cellulose treated may be wood floc, cotton, including cotton linters, regenerated cellulose, linen, ramie, or the like. The cellulose may be in the form of floc, fibers, yarns, filaments or fabrics, including both woven fabrics and felted products in the form of sheets, mats, or battings. Paper is a typical non-woven product. The cellulose may be preconditioned by kier-boiling or scouring, if desired. The fabrics used may be composed of mixed fibers. Mercerized yarn or fabric may be treated with the boron trifluoride solutions. While usually dry cellulose materials are treated, there may also be used moist cellulose which contains insufficient water to dilute the boron trifluoride bath below the effective concentrations.

The processing of cellulosic materials with an aqueous solution of 58% to 67% of boron trifluoride may be combined with mechanical treatments. The treating may be accomplished with the cellulosic material held under tension or the material may be treated without tension. In the latter case there may occur shrinkage with an increase in thickness. Also, crepe-like effects may thus be obtained. Felted products may be calendered to impart smooth surface. Filaments may be stretched during or after spinning. Many other variations and combinations of processing steps will be evident to those skilled in the art. Some of the great advantages of the process of this invention are the ease of separating or removing the reactant, including the volatility of the essential component of the solvent solutions, and the mildness of the reactant with respect to its action on cellulose.

I claim:

1. The process of modifying cellulose which comprises treating cellulose by bringing it in contact with a solution of 58 to 67 parts by weight of boron trifluoride in water to make 100 parts, said treating being effected at a temperature between 30° C. and the freezing point of said solution.

2. The process of modifying cellulose which comprises treating it with a solution of 58% to 67% by weight of boron trifluoride in water at a temperature between 30° C. and the freezing point of the said solution and, after modifying the cellulose by said treating, removing the boron trifluoride therefrom.

3. A process of forming solutions of cellulose which comprises treating cellulose by bringing it in contact with a solution of 58% to 67% by weight of boron trifluoride in water at a temperature between 30° C. and the freezing point of the said solution and continuing thus treating the cellulose with said solution until it has dissolved therein.

4. As a new composition of matter, a solution of 58% to 67% by weight of boron trifluoride in water having cellulose dissolved therein.

5. The process of parchmentizing a fibrous cellulose sheet which comprises treating said sheet by bringing it in contact with a solution of 58% to 67% by weight of boron trifluoride in water at a temperature between 30° and −5° C., continuing thus treating the said fabric until translucent, parchment-like properties are observed in the treated cellulose fabric, and then removing therefrom the boron trifluoride.

6. The process of claim 5 in which the cellulose sheet is paper.

7. A process for modifying a woven cellulose fabric which comprises impregnating said fabric with a 58% to 67% by weight solution of boron trifluoride in water at a temperature between 30° and −5° C., maintaining said fabric in contact with said solution at said temperature until the fabric has become swollen, and then removing the boron trifluoride solution therefrom.

LOUIS H. BOCK.

REFERENCES CITED

The following references are of record in the file of this patent:

UNITED STATES PATENTS

| Number | Name | Date |
|---|---|---|
| 234,345 | Swan | Nov. 9, 1880 |
| 494,149 | Lodyguine | Mar. 28, 1893 |
| 543,986 | Edison | Aug. 6, 1895 |

FOREIGN PATENTS

| Number | Country | Date |
|---|---|---|
| 238,102 | Germany | Sept. 16, 1911 |